(No Model.)
J. W. GIBSON.
DENTAL ENGINE.
No. 449,848.  Patented Apr. 7, 1891.
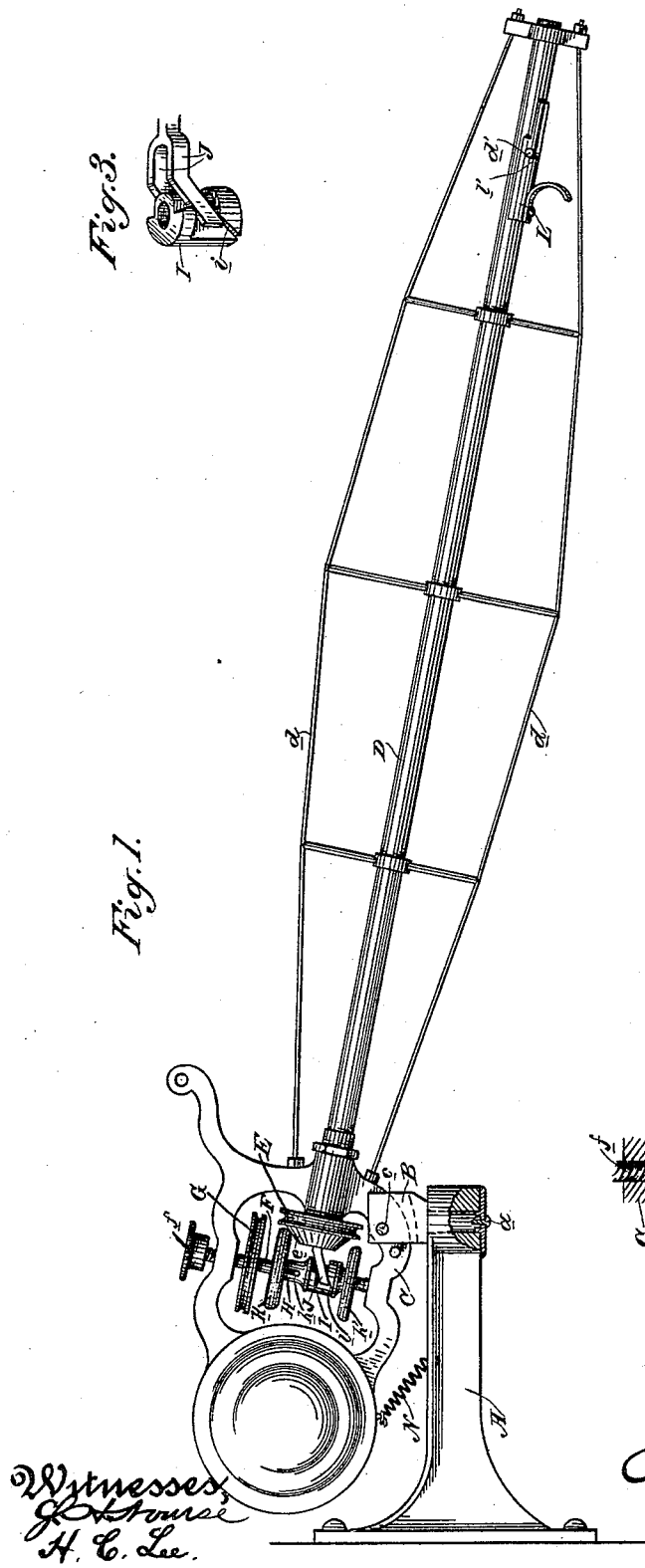
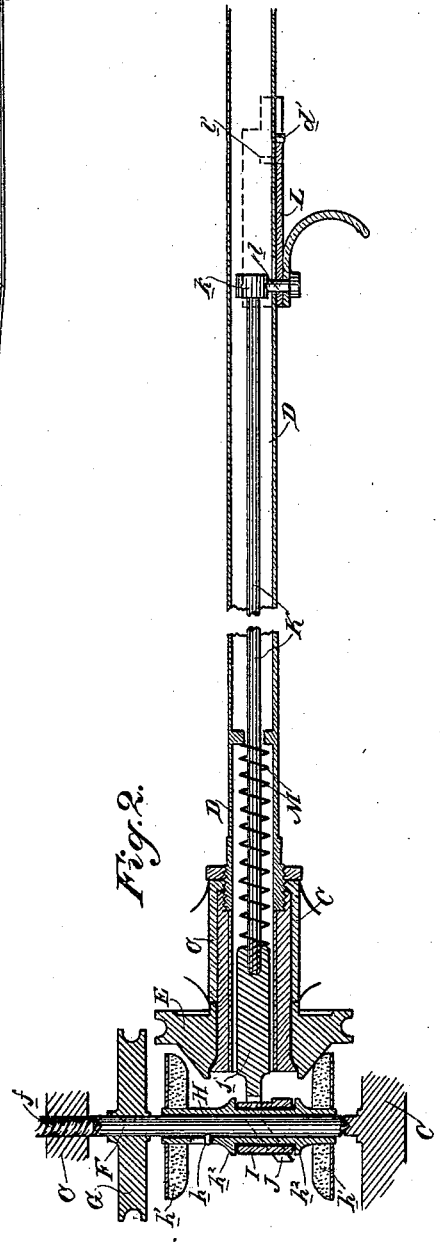

UNITED STATES PATENT OFFICE.

JOHN W. GIBSON, OF SAN FRANCISCO, CALIFORNIA.

DENTAL ENGINE.

SPECIFICATION forming part of Letters Patent No. 449,848, dated April 7, 1891.

Application filed September 22, 1890. Serial No. 365,828. (No model.)

*To all whom it may concern:*

Be it known that I, JOHN W. GIBSON, a citizen of the United States, residing in the city and county of San Francisco, State of California, have invented an Improvement in Dental Engines; and I hereby declare the following to be a full, clear, and exact description of the same.

My invention relates to the class of dental engines; and it consists in the novel supporting-bracket and a novel reversing mechanism hereinafter fully described, and specifically pointed out in the claims.

The object of my invention is to provide a dental-engine bracket which is adapted to be turned both horizontally and vertically, and also to provide simple and effective means for readily reversing the motion of the engine.

Referring to the accompanying drawings for a more complete explanation of my invention, Figure 1 is a side elevation of my device. Fig. 2 is a horizontal section. Fig. 3 is a detail of cam mechanism.

A is a bracket-arm, which is to be secured to the wall or other support. In the outer end of this arm is pivotally connected the bearing B, which is fitted to the arm by means of its lower or pivot portion passing down into the end of the arm and secured by a screw $a$ underneath. The bearing rests on the arm, so that by tightening the screw the parts are held fixed in any given position. The upper end of the bearing B is slotted, and in this is fitted the carrying-plate C, which is pivoted thereto by a horizontal pin $c$, so that the plate can move up and down through an arc in a vertical plane.

Secured to the forward end of the plate C is an outwardly-extending hollow rod or tube D, which is suitably stiffened by braces $d$. To the outer end of this rod the instrument is to be connected by suitable means unnecessary herein to show, and its inner end may, if desired, be coupled to an extension D'.

Upon the inner end of the rod D, upon its extension D', the pulley E is mounted and adapted to rotate, said pulley deriving its power from a suitable belt from the motor, unnecessary herein to show. The pulley has a beveled frictional face $e$.

Mounted vertically in the carrying-plate, which is of an open-work character, is a shaft F, the ends of which are fitted in bearings, one of which is a set-screw $f$, whereby the shaft may be properly held in place and tightened up to the necessary extent. Upon one end of the shaft is the pulley G, from which a belt (not shown) is intended to extend to the outer end of the rod D, to drive the instrument-connections.

Mounted upon the shaft F is a sleeve H, which is adapted to slide upon said shaft, but rotates with it by means of a feather or spline connection $h$. This sleeve carries at each end a bevel-faced friction-gear $h'$, the distance between which is such that when one of said gears is thrown into engagement with the beveled frictional face $e$ of pulley E the other is thrown out of engagement with it, and vice versa. The gears $h'$ are preferably rubber-faced.

Upon the sleeve is freely fitted a ring I between collars $h^2$ of the sleeve, and in this ring are made the inclined cam-grooves $i$, one on each side. In these grooves fit the correspondingly-inclined cam-arms J, which are carried by a sliding piece $j$, fitted in the hollow rod or tube D. From this sliding piece extends outwardly within the rod or tube a wire K, which has on its outer end a bearing-piece $k$, with which a handled slide L on the exterior of the rod D is connected by means of a pin $l$, passing down through an elongated slot in the rod D and entering the piece. The slide L can be locked when drawn outwardly to its limit by means of a pin $d'$ on the rod over which the slide is slotted, and with which a cross-slot $l'$ on the slide is adapted to engage. This slide, being near the outer end of the engine, is in position to be conveniently operated. A spring M is fitted around the wire K within the tube D, and serves to keep the cam-arms J normally projected. A spring N holds the entire frame up.

The operation of the device is as follows: The engine can be turned to any position in a horizontal or vertical plane, as a result of the combined movements of the bearing B and the swinging plate C, so that it cannot only be turned from side to side but it can also be raised or lowered. The back of the plate C may be made very heavy, as shown, to serve as a counter-balance. Now, by pulling the slide L outwardly the wire K is pulled so that the cam-arms J are drawn back, and in this movement said arms, acting in the cam-grooves, force the sleeve H in one direction, whereby one of the friction-gears $h'$ comes in contact with the friction-face $e$ of the drive-pulley E, while the other gear is thrown out of contact with it. The slide is locked in this position and held by the cross-slot $l'$ and pin $d'$. Now, to reverse the movement the slide L is unlocked, and under the influence of the spring M the cam-arms J are projected, so that, acting in the cam-grooves, they slide the sleeve in the opposite direction, thereby bringing the other friction-gear $h'$ into contact with the friction-face of the pulley E and throwing the first-named gear out of said engagement. Thus the motion of the engine may be readily reversed.

The spring N, which holds the frame up, is connected with the bracket-arm A and with the weighted rear end of the plate C. It is fastened to the side of the bracket-arm, so that it pulls to one side, thus making it automatic.

The reversing mechanism is operated simply by the use of one finger.

The return of the frame to its position out of the way is automatic, the spring N returning it.

Having thus described my invention, what I claim as new, and desire to secure by Letters Patent, is—

1. In a dental engine, a pivoted plate carrying the driving-gears, a sliding sleeve within said plate having friction-gears on opposite ends, and cam-arms for moving the sleeve to reverse the motion of the gears, substantially as herein described.

2. In dental engines, the vertically-pivoted bearing, the plate C, mounted upon a horizontal axis therein so that it may freely and normally swing in vertical planes, the drive-pulley E, and the opposing friction-gears mounted on a sliding sleeve within the arm, a shaft upon which the sleeve slides, and a power-transmitting pulley on said shaft, substantially as herein described.

3. In a dental engine, the combination of the drive-pulley having the friction-face, the shaft F, the power-transmitting pulley, the sliding sleeve feathered on said shaft, the opposing friction-gears on said sleeve, the ring on said sleeve with cam-grooves, and the movable cam-arms fitting in said grooves for shifting the friction-gears, substantially as herein described.

4. In dental engines, a plate C, carrying the driving-gears and the frame to which the instrument is connected, said plate being mounted on horizontal and vertical axes so that it may normally and freely move in vertical and horizontal planes, and a slide remote from the plate having a connection provided with cam-arms for shifting the gears to reverse the motion, substantially as herein described.

5. In a dental engine, the carrying-plate C, the drive-pulley mounted therein and having a friction-face, the vertical shaft and transmitting-pulley also mounted in said plate, in combination with the reversing mechanism, consisting of the sliding sleeve feathered on the shaft and the friction-gears on said sleeve adapted to be thrown alternately into and out of engagement with the friction-face of the drive-pulley, the ring on the sleeve having cam-grooves, and the movable cam-arms fitting in said grooves, whereby the friction-gears are shifted, and a slide at the outer end of the frame and connections for operating the cam-arms, substantially as herein described.

6. In a dental engine, the combination of the carrying-plate C, the hollow rod extending therefrom, the drive-pulley having the friction-face, the vertical shaft in the carrying-plate, the transmitting-pulley on said shaft, the sliding sleeve feathered on the shaft, the opposing friction-gears on said sleeve, the ring on the sleeve having cam-grooves, the cam-arms engaging said grooves, the wire connected with said arms and passing into the hollow rod, and the slide near the outer end of the rod connected with the wire for operating the cam-arms, substantially as herein described.

7. In a dental engine, the carrying-plate C and the hollow rod extending therefrom, in combination with the drive-pulley mounted therein and having the friction-face, the vertical shaft also mounted in said plate, and the transmitting-pulley mounted on said shaft, the sliding sleeve on the shaft and the friction-gears on said sleeve, the ring on the sleeve with its cam-grooves, the cam-arms engaging said grooves, the wire connected with said arms and passing into the hollow rod, the slide near the outer end of the hollow rod and connected with the wire, and the spring within the hollow rod for returning the wire, substantially as herein described.

8. In a dental engine, the combination of the bracket-arm, the vertically-pivoted bearing, the horizontally-pivoted carrying-plate of the frame, and the spring connected with said carrying-plate and bracket-arm, substantially as herein described.

In witness whereof I have hereunto set my hand.

JOHN W. GIBSON.

Witnesses:
T. M. HAWLEY,
H. A. CONWELL.